Patented May 29, 1951

2,554,528

UNITED STATES PATENT OFFICE 2,554,528

PROCESS FOR REACTING KETENE AND UNSATURATED CARBONYLIC COMPOUNDS

John T. Fitzpatrick, Charleston, W. Va., assignor, by mesne assignments, to Union Carbide and Carbon Corporation, a corporation of New York No Drawing. Application February 5, 1949, Serial No. 74,862

14 Claims. (Cl. 260—494)

This invention relates to the production of polymeric derivatives of ketene and certain unsaturated aldehydes and ketones, at least some of which have utility for such purposes as in the production of coating compositions of the oil-modified alkyd type and in upgrading, i. e., improving the drying qualities, of drying and semi-drying oils. They may be hydrogenated or hydrogenolized to give products useful in the production of plasticizers for synthetic resins. More especially the invention concerns a novel process for making such products by reacting, in the presence of certain clay type reaction promoters, ketene and α,β-olefinic aldehydes or ketones having structures corresponding to the formula:

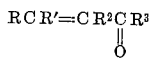

wherein R represents a radical selected from the class consisting of the alkyl groups and the phenyl group; $R'$ and $R^2$, respectively, represents a member of the class consisting of hydrogen and the alkyl groups having one to four carbon atoms; and $R^3$ represents a member of the class consisting of hydrogen and the alkyl groups.

Among olefinic aldehydes and ketones useful in the process and having a carbonyl group as the sole functional group other than the C=C group may be mentioned aldehydes of the acrylic series such as crotonaldehyde, α-ethyl propyl acrolein, α-methyl ethyl acrolein, α-propyl acrolein, tiglic aldehyde, α-ethyl crotonaldehyde and cinnamaldehyde; and α,β-olefinic ketones such as ethylidene acetone, mesityl oxide, butylidene acetone, propenyl ethyl ketone and propenyl isopropyl ketone.

Processes already are known for the production of unsaturated carboxylic acids by reacting ketene and certain unsaturated aldehydes and ketones at low temperatures around —50° C. to +40° C. in the presence of strongly acidic catalysts of the Friedel-Crafts type such as the boron trifluoride and other strong acidic boron compounds, aluminum halides and the like. The initial reaction products are polymeric adducts of ketene and the carbonylic compound, and appear to be largely polymeric esters. Processes of this type are disclosed in the United States Patents Nos. 2,382,464 and 2,484,067 of A. B. Boese, Jr. The polymeric products, and the reaction mixture containing the same, are useful in making coating compositions of the oil-modified type, after neutralization or removal of the catalyst.

However, the use in prior processes of the strongly acidic catalysts of the aforesaid type is subject to certain objections in connection with the manufacture of these products from ketene and unsaturated carbonyl compounds. Not only is the preferred catalyst, boron trifluoride, costly, but where these strongly acidic catalysts are used it is usually necessary, in order to assure the production of a polymeric product sufficiently free from color to be satisfactory as a component of light-colored coating compositions, that the molar ratio of ketene to the crotonaldehyde or other unsaturated carbonyl compound be maintained at around 1:1 within fairly narrow limits. Moreover, it is often extremely difficult to remove all of the catalyst from the reaction products in a practicable manner. Washing the reaction mixture with water often is suprisingly ineffective since such catalysts as boron trifluoride apparently form complexes which are only slowly attacked by water. The presence in the polymeric product of even a very small amount of residual catalyst may seriously injure its color stability and that of the product later made therefrom.

It now has been found that the reaction between ketene and the aforesaid unsaturated aldehydes and ketones to form somewhat similar polymeric products, useful for the production of doubly unsaturated monocarboxylic acids, and some of which are useful for the production of coating compositions having an oil-modified alkyd type resin base, can be catalyzed by hydrous aluminum silicates, and inorganic materials having essentially a hydrous aluminum silicate structure, such as the natural clays, and similar clays that have been activated by treatment with a mineral acid such as dilute sulfuric acid or hydrochloric acid, e. g., a 10% aqueous solution of sulfuric acid, with subsequent removal of excess acid with water, under conditions commonly used in producing acid-activated natural clays.

A large number of solid catalysts have been tested in connection with the process. All of those compounds which possess a hydrous aluminum silicate structure, with or without the interposition of sodium, potassium, calcium, magnesium or iron in the crystal lattice (as shown by chemical analysis, electron diffraction, and a study of the ion-exchange properties), effectively catalyze the reaction.

The several different hydrous aluminum silicate structures are effective catalysts though with different degrees of reactivity. Clays of the montmorillonite, kaolinite and attapulgite types (all complex hydrous aluminum silicates) are useful catalysts. The activity of each of these types of clays is improved by treatment of the clay with a mineral acid. Chemically pure hydrous aluminum silicate $Al_2O_3 \cdot 2SiO_2 \cdot 2H_2O$ also is an active catalyst. Thus the cations adsorbed on all clays are not necessary to impart catalytic activity to these clays for this type of reaction.

On the other hand, aluminum sulfate, aluminum phosphate, and molybdic acid have some catalytic activity; and such compounds as silica, α- and γ-aluminas, magnesium silicate, lithium phosphate, calcium phosphate, tungstic acid and activated carbon are without catalytic activity.

All clays contain water, part of which is adsorbed and part of which is actually involved in the crystal lattice. It is preferred to remove substantially all of the adsorbed water since otherwise it reacts with parts of the ketene and carbonylic compound and consumes them to form other compounds. In the case of ketene and crotonaldehyde such adsorbed water forms therewith crotylidene diacetate.

The adsorbed water preferably is removed from the clay by roasting the latter at approximately 200° C.–300° C., or by azeotropic distillation with xylene or other inert volatile liquids forming heterogeneous constant boiling mixtures with water. The removal of all of the water present in the crystal lattice of the clay is objectionable, and results in a loss of catalytic activity.

The reaction of the ketene and the carbonylic compound preferably is conducted at temperatures around 0° C. to 10° C. but this temperature range is not critical. Higher temperatures up to 40° C. may be used, but give a darker polymeric product; and lower temperatures, e. g., 50° C., give a slower reaction without a corresponding improvement in color.

It is preferred to conduct the reaction between ketene and the carbonylic compound in the presence of an inert organic solvent for the reactants because of the high viscosity of the polymeric products formed. Among solvents found useful in the process may be mentioned benzene hydrocarbons such as benzene, toluene and the xylenes; aliphatic ethers having two to eight carbon atoms such as methyl ether, ethyl ether, isopropyl ether and dioxane; and inert chlorinated solvents such as chloroform, carbon tetrachloride, chlorobenzene, ethylene dichloride, and trichloroethane. The aromatic hydrocarbons are the preferred solvents and usually give the lightest colored polymeric products. When reacting ketene and crotonaldehyde even acetone can be used as the solvent since, although it is not inert to ketene, it reacts therewith much slower than does crotonaldehyde. However, the resultant products tend to be somewhat dark.

If desired, the solvent, and any unreacted ketone or aldehyde can be removed from the polymeric product by steam distillation or by vacuum distillation, or a combination of both may be used.

By far the best results, both with respect to the yields of polymeric product and the effectiveness of such products in upgrading drying oils and in the production of oil-modified alkyd type coating compositions are secured when reacting ketene and crotonaldehyde in accordance with the process.

It is a novel feature of the invention that the molar ratio of ketene to carbonylic compound can be varied widely. Thus, in reacting ketene and crotonaldehyde according to the invention an excess of either ketene or crotonaldehyde over equimolar proportions can be used. However, an excess of ketene over equi-molar proportions tends to give products of poor color stability, and is usually avoided in practice. Crotonaldehyde can be used in large excess without adversely affecting the product. In such cases most of the excess crotonaldehyde is removed by vacuum distillation and/or steam distillation, but a small amount remains in the product and tends by its presence to yield a product that is lighter in color.

The amount of the catalyst employed varies with the particular catalyst used but in general it ranges between around 10% and 100% by weight of the total amount of the ketene and carbonylic compound reacted. Somewhat smaller amounts of the more active catalysts, e. g. 5% of the mineral acid-activated montmorillonite clays, may be used effectively; and much larger amounts of the catalysts are not harmful to product or process.

The conditions used in conducting the reaction can be varied widely. One preferred procedure is to feed the ketene and carbonylic compound, e. g., crotonaldehyde, concurrently in approximately equi-molar proportions into an agitated slurry of the catalyst in the inert solvent maintained at the desired reaction temperature until the desired concentration of the polymeric product has been attained. Additional quantities of catalyst can be added from time to time whenever the blow-off gas from the closed reactor contains unreacted ketene.

In another form of the invention, the crotonaldehyde, catalyst and inert solvent are charged into a closed reactor having a cooling jacket, and brought to the desired reaction temperature. Ketene then is fed into the mixture until the desired amount has been absorbed.

For commercial operation it is preferred to employ a continuous process wherein ketene, the carbonylic compound, the catalyst and the inert solvent are fed continuously into a closed jacketed reactor provided with agitating means and with an outlet associated with means for constantly drawing off a quantity of the reaction mixture equal to the total feed to the reactor.

It is not necessary to use pure ketene in the process. Thus, the gaseous products of the pyrolysis of acetone can be used, preferably after removing therefrom unreacted acetone, since the presence of acetone tends to darken the polymeric adduct.

After the reaction between the ketene and carbonylic compound has progressed to the desired stage, the catalyst is removed readily by filtration. The color of the product is improved by removing the catalyst before wet distillation of the excess carbonylic compounds and solvent. If desired, the catalyst separation can be effected by heating and agitating the reaction mixture with water for a short time whereby the catalyst is preferentially wetted by the water and can be removed with the resultant water layer by decantation. However, refluxing in the presence of the catalyst tends to darken the product, and part is lost by solution in the water layer.

During the distillation of the reaction mixture for removal of the solvent and excess carbonylic compound, heating of the mixture to temperatures high enough to darken the polymeric product generally is undesirable; and in the case of the polymeric product of ketene and crotonaldehyde distillation temperatures above 100° C. are generally avoided. A final stripping operation at a kettle temperature of 90° C. at a pressure of 3 millimeters of mercury in the presence of a trace of water yields a polymeric product that is substantially free from solvent and unreacted crotonaldehyde.

The products made by this process are believed to be largely complex polymeric esters. Typical products made by reacting ketene and crotonaldehyde by the process are viscous liquids ranging from light amber to reddish brown in color, and having specific gravities of around 1.080 to 1.110 at 30° C., and refractive indices of around 1.4700 to 1.4900. The viscosities of these products are high, ranging from about 200 to 5,000 poises or even higher at 20° C. These ketene-crotonaldehyde adducts have higher molecular weights than those made by reactions using a boron fluoride catalyst, and they do not provide as high yields of sorbic acid when treated with strong mineral acids (about 40%–50%, compared with about 60%–70%). Such products have saponification equivalent weights of 118–150 which are somewhat above the theoretical equivalent weight for a hydroxyhexenoic acid lactone or polyester, indicating that some linkages in addition to ester linkages are present. The vacuum distillation in a molecular type still of the polymeric product of ketene and crotonaldehyde yielded a fraction boiling up to 135° C. at 30 microns of mercury pressure and constituting one fourth of the product. The distillable fractions had average molecular weights of 250–350. The distillation residue had an average molecular weight of about 1,140.

The polymeric derivatives of ketene and an unsaturated carbonylic compound made in accordance with the invention can be converted to unsaturated carboxylic acids by heating the reaction mixture with an aqueous solution of a strong mineral acid such as sulfuric or hydrochloric acid, preferably after removal of the solvent in which the reaction was performed in instances where the solvent is water-insoluble. Such acid treatment can be applied advantageously, also, to the reaction mixture suspended in water or in a water-soluble solvent such as dioxane or glacial acetic acid.

The following examples serve to illustrate the invention. In the examples all parts are given in terms of weight unless otherwise indicated:

*Example 1*

Into a 3-liter reaction flask, cooled in an acetone bath to which solid $CO_2$ was intermittently added to control the temperature, there were charged 1,200 parts of xylene, 515 parts of crotonaldehyde, and 75 parts of Attapulgus fuller's earth (a hydrous aluminum silicate clay having an attapulgite type of lattice structure) which previously had been dried in an oven at 225° C. The mixture was cooled to 0° C. and, while maintaining it at temperatures of −2° C. to +3° C., ketene was passed in at the rate of approximately 152 parts per hour. After 40 minutes 75 parts of the catalyst were added. After a total of 75 minutes reaction time the reaction mixture was filtered and the filter cake was washed with about 350 parts of xylene; the filtrates were combined and were stripped to a kettle temperature of 100° C. at 2 millimeters of mercury pressure. To the residue were added 100 parts of water and about 86 parts of xylene and the mixture was distilled to a kettle temperature of 90° C. at 2–3 millimeters of mercury. 500 parts of residual polymeric product were obtained in the form of a light colored viscous liquid residue which was useful for improving alkyd resins and drying oils.

*Example 2*

A mixture of 532 parts of cinnamaldehyde, 60 parts of a commercially available mineral acid-activated montmorillonite type of hydrous aluminum silicate clay which had been dried in an oven at 215° C., and 709 parts of dry ethyl ether, was cooled to 0° C., and ketene was passed into the mixture for 40 minutes at the rate of approximately 152 parts per hour with agitation, while maintaining the mixture at around 0° C. After 15 minutes further agitation the reaction mixture was filtered, and the filter cake was washed with dry ethyl ether. The combined washings and filtrate were distilled at atmospheric pressure to remove the ethyl ether and then were distilled under vacuum to a kettle temperature of 300° C. under a pressure of 6–10 millimeters of mercury, yielding 174 parts of the polymeric product as a viscous liquid somewhat dark in color due to the high distillation temperature used. There were recovered from the distillate from the vacuum distillation about one-half the cinnamaldehyde and a small amount of cinnamalacetic acid ($\beta$-styryl-acrylic acid).

*Example 3*

This example illustrates a continuous type process for the production of useful resinous polymeric adducts of the invention. The apparatus used included a closed externally cooled kettle surmounted by a column filled with Raschig rings in which most of the reaction occurred. Gaseous ketene and nitrogen were fed to the kettle and passed up through the column where the ketene reacted with a countercurrent flowing stream of a slurry of crotonaldehyde and the catalyst in xylene, which slurry was continuously withdrawn from the kettle and a selected portion thereof was passed through a brine-cooled coil and circulated to the upper portion of the packed column, under action of a centrifugal pump, whence it flowed down over the packing to the kettle. Another selected portion of the slurry leaving the pump outlet was continuously withdrawn from the system through a valved outlet in the pump outlet line for recovery of the polymeric product. The balance of the slurry passing through the pump was recirculated directly to the kettle. Crotonaldehyde was fed continuously to the kettle through a metering pump; and a slurry of catalyst in xylene was fed at frequent intervals in small amounts to the kettle. A brine-cooled reflux condenser mounted on the top of the column prevented loss of crotonaldehyde while permitting escape of the nitrogen used for agitating the slurry and as an inert gas.

In beginning the operation, the kettle was charged with 432 parts of xylene, 100 parts of crotonaldehyde and 60 parts of dry acid-activated montmorillonite type of clay. The circulating pump was started and the kettle cooled to 0° C. Then 102 parts of crotonaldehyde per hour, 42 parts per hour of ketene and 84 parts per hour of nitrogen were fed to the kettle. Every 15 minutes an additional 12 parts of catalyst in 86.3 parts of xylene were added. The reaction temperature was maintained around 0° C. by a chloroform-Dry Ice bath. After 20 minutes' operation a portion of the product withdrawn from the kettle by the pump was removed from the system at the rate of 527 parts per hour. Under these conditions the reaction of the ketene was complete. During 4.75 hours 485 parts of crotonaldehyde, 200 parts of ketene, 216 parts of catalyst and 1,553 parts of xylene were fed to the kettle, and 2,326 parts of the product slurry were withdrawn and filtered. The filtrate was distilled through a three-foot helix-packed column in the presence of water to a head temperature of 92° C. to remove excess crotonaldehyde and a small amount of the xylene. The light amber residue, 27% of which was the desired polymeric product (the balance being principally xylene), was used in making oil-modified alkyd surface coatings.

Example 4

A mixture of 704 parts of dry ethyl ether and 120 parts of dry kaolinite was stirred at −3° C. to +3° C. while 153 parts of crotonaldehyde and 102 parts of ketene were added thereto concurrently over a period of 40 minutes. The reaction mixture then was filtered, and the filtrate was stripped to a kettle temperature of 35° C. under a pressure of 3 millimeters of mercury. A yield of 84% of the resultant polymeric product was secured in the form of a viscous high boiling mass. A portion thereof was converted to sorbic acid by a treatment with a dilute acid in the general manner described in Example 5.

Example 5

A mixture of 714 grams of dry ethyl ether and 60 grams of a dried acid-activated montmorillonite type of clay was held at −5° C. to +3° C. while 89 grams of ketene and 135 grams of crotonaldehyde were mixed therewith during 35 minutes. Then 60 grams of the same catalyst were added and the feed of reactants continued until a total of 183 grams of ketene and 274 grams of crotonaldehyde had been added. The reaction mixture was filtered and the filtrate was stripped in a still to a kettle temperature of 35° C. under a pressure of 4 millimeters of mercury. The weight of high boiling polymeric product thus recovered as residue was 90% of the theoretical.

To 65 grams of this product were added 100 cc. of an aqueous solution containing 50% acetic acid and 8.75% hydrochloric acid, and the mixture was refluxed for 3 minutes, then cooled to 0° C. and filtered. The filtrate was evaporated to about 65 cc. under vacuum, cooled to 0° C. and filtered, and the crystals of sorbic acid thus produced were washed and dried.

Example 6

A mixture of 661 parts of dry ethyl ether, 350 parts of ethylidene acetone, and 75 parts of a dry attapulgite type natural clay was charged to a reaction vessel and cooled to 0° C. During 36 minutes 91 parts of ketene were introduced with agitation while maintaining the mixture at 0° C. After 15 minutes the reaction mixture was filtered and fractionally distilled under vacuum to remove the ether and excess ethylidene acetone. The viscous resinous product was recovered as still residue after carrying the distillation to a kettle temperature of 235° C. under a pressure of 7 millimeters of mercury.

Example 7

76 parts of ketene were slowly passed into a mixture of 765 parts of dry ethyl ether, 380 parts of 2-ethyl-3-propylacrolein and 75 parts of the catalyst recited in Example 6 under the conditions described in that example. After filtering the reaction mixture, the filtrate was distilled under vacuum to a kettle temperature of 237° C. at a pressure of 4 millimeters of mercury. The residual polymeric product, 95 parts, was a viscous tarry liquid. From the distillate a small amount of 4-ethyl-2,4-octadienoic-1 acid separated on standing.

Example 8

A mixture of 710 parts of dry ethyl ether, 395 parts of mesityl oxide and 60 parts of a dry acid-activated montmorillonite type of clay was cooled to 0° C. and 102 parts of ketene were passed into it over a period of 40 minutes while keeping the temperature at 0° C. The resultant reaction mixture was filtered, and the filtrate was distilled to a kettle temperature of 335° C. under 6 millimeters of mercury pressure, thereby yielding a residual resinous polymeric product boiling above 335° C. under 6 millimeters of mercury pressure.

As previously indicated, at least some of the novel polymeric products of the reaction of ketene and the unsaturated carbonylic compound in the presence of a hydrous aluminum silicate have a high degree of utility in the improving or "upgrading" of slow-drying oils, like soya bean and linseed oils, to form oils commensurate in drying properties with tung oil and oiticica oil. These polymeric products are useful also for the production of alkyd mixed esters of polyhydric alcohols with mixtures of drying and semi-drying oils, and acid derivatives thereof, and the polymeric products of this invention. The unsaturated carboxylic acids produced by the treatment of the polymeric products of the invention with a strong mineral acid are useful for similar purposes and as intermediates for the synthesis of a wide variety of compounds. The esters of the higher unsaturated carboxylic acids have properties indicating their suitability as starting materials for the production of high-boiling solvents and plasticizers.

The term "dry hydrous clay" is used in the claims to designate hydrous clays which are substantially free from adsorbed moisture.

The invention is susceptible of modification within the scope of the appended claims.

I claim:

1. Process for producing polymeric reaction products of ketene and unsaturated carbonylic compounds, which comprises reacting at temperatures within the range between −50° C. and +40° C. successive portions of ketene and an unsaturated carbonylic compound of the formula $$RCR'=CR^2CR^3$$
$$\|$$
$$O$$

wherein R designates a member of the class consisting of the alkyl groups and the phenyl group; R' and R², respectively, designates a member of the class consisting of hydrogen and the lower alkyl radicals having one to four carbon atoms; and R³ designates a member of the class consisting of hydrogen and the alkyl groups; in the presence of an inert solvent for the reactants and of a hydrous aluminum silicate.

2. Process for producing polymeric reaction products of ketene and unsaturated carbonylic compounds, which comprises reacting at temperatures within the range between −50° C. and +40° C. successive portions of ketene and an unsaturated carbonylic compound of the formula $$RCR'=CR^2CR^3$$
$$\|$$
$$O$$

wherein R designates a member of the class consisting of the alkyl groups and the phenyl group; R' and R², respectively, designates a member of the class consisting of hydrogen and the lower alkyl radicals having one to four carbon atoms; and R³ designates a member of the class consisting of hydrogen and the alkyl groups; in the presence of an inert solvent for the reactants and of an acid-activated hydrous aluminum silicate.

3. Process for producing polymeric reaction products of ketene and unsaturated carbonylic compounds, which comprises reacting at temperatures within the range between −50° C. and +40° C. successive portions of ketene and an unsaturated carbonylic compound of the formula $$RCR'=CR^2CR^3$$
$$\parallel$$
$$O$$

wherein R designates a member of the class consisting of the alkyl groups and the phenyl group; R' and R², respectively, designates a member of the class consisting of hydrogen and the lower alkyl radicals having one to four carbon atoms; and R³ designates a member of the class consisting of hydrogen and the alkyl groups; in the presence of an inert solvent for the reactants and of a hydrous natural clay.

4. Process for producing polymeric reaction products of ketene and unsaturated carbonylic compounds, which comprises reacting at temperatures within the range between −50° C. and +40° C. ketene and an unsaturated carbonylic compound of the formula $$RCR'=CR^2CR^3$$
$$\parallel$$
$$O$$

wherein R designates a member of the class consisting of the alkyl groups and the phenyl group; R' and R², respectively, designates a member of the class consisting of hydrogen and the lower alkyl radicals having one to four carbon atoms; and R³ designates a member of the class consisting of hydrogen and the alkyl groups, in the presence of an inert solvent for the reactants and an acid-activated natural clay possessing a hydrous aluminum silicate structure and containing in the crystal lattice at least one atom of the class consistting of sodium, potassium, calcium, magnesium and iron.

5. Process for producing polymeric reaction products of ketene and crotonaldehyde useful in making coating compositions and in up-grading drying and semi-drying oils, which comprises reacting ketene and crotonaldehyde at temperatures within the range between −50° C. and +40° C., in the presence of a suspension in an inert solvent for the said reactants of a hydrous aluminum silicate.

6. Process for producing polymeric reaction products of ketene and crotonaldehyde useful in making coating compositions and in up-grading drying and semi-drying oils, which comprises continuously feeding to a reaction zone and reacting at temperatures within the range between −50° C. and +40° C. successive portions of ketene and crotonaldehyde in the presence of a suspension in an inert solvent for the said reactants of a dry hydrous natural clay.

7. Process for producing polymeric reaction products of ketene and crotonaldehyde useful in making coating compositions and in up-grading drying and semi-drying oils, which comprises concurrently feeding ketene and crotonaldehyde to a reaction zone and reacting the same at temperatures within the range between −50° C. and +40° C. in the presence of a suspension in an inert solvent for the said reactants of an acid-activated hydrous aluminum silicate base natural clay.

8. Process for producing polymeric reaction products of ketene and crotonaldehyde useful in making coating compositions and in up-grading drying and semi-drying oils, which comprises continuously feeding to a reaction zone and reacting at temperatures within the range between −50° C. and +40° C. successive portions of ketene and crotonaldehyde in the presence of a suspension in an inert solvent for the said reactants of a clay possessing a hydrous aluminum silicate structure and containing in the crystal lattice at least one atom of the class consisting of sodium, potassium, calcium, magnesium and iron.

9. Process for producing polymeric reaction products of ketene and crotonaldehyde useful in making coating compositions and in up-grading drying and semi-drying oils, which comprises continuously feeding to a reaction zone and reacting at temperatures within the range between −50° C. and +40° C. successive portions of ketene and crotonaldehyde in the presence of a suspension in an inert solvent for the said reactants of a hydrous aluminum silicate clay selected from the class consisting of the montmorillonite type, kaolinite type and attapulgite type clays.

10. Process for producing polymeric reaction products of ketene and crotonaldehyde useful in making coating compositions and in up-grading drying and semi-drying oils, which comprises reacting at a temperature within the range between −50° C. and +40° C., successive portions of ketene and crotonaldehyde in the ratio of at least one mol of the aldehyde per mol of ketene, in the presence of a suspension in an inert solvent for the said reactants of a hydrous aluminum silicate base clay substantially free from adsorbed moisture, and removing the said solvent and at least the major portion of unreacted crotonaldehyde from the resultant reaction mixture at temperatures not substantially higher than 100° C.

11. Process for producing polymeric reaction products of ketene and unsaturated carbonylic compounds, which comprises reacting at temperatures within the range between −50° C. and +40° C. in an atmosphere of an inert gas successive portions of ketene and an unsaturated carbonylic compound of the formula $$RCR'=CR^2CR^3$$
$$\parallel$$
$$O$$

wherein R designates a member of the class consisting of the alkyl groups and the phenyl group; R' and R², respectively, designates a member of the class consisting of hydrogen and the lower alkyl radicals having one to four carbon atoms; and R³ designates a member of the class consisting of hydrogen and the alkyl groups; in the presence of an inert solvent for the reactants and of a hydrous aluminum silicate base clay.

12. Process as defined in claim 1, together with the step of removing the hydrous aluminum silicate from the resultant reaction mixture, and thereafter removing said solvent and excess reactants from said mixture.

13. Process as defined in claim 5, together with the step of removing from the resultant reaction mixture said hydrous aluminum silicate base clay, and thereafter removing said solvent and excess reactants from said mixture.

14. Process as defined in claim 9, together with the step of removing from the resultant reaction mixture said hydrous aluminum silicate clay prior to removing said solvent and excess reactants from said mixture.

JOHN T. FITZPATRICK.

No references cited.